(12) United States Patent
Tsai

(10) Patent No.: US 6,945,307 B2
(45) Date of Patent: Sep. 20, 2005

(54) METHOD FOR MANUFACTURING A GOLF CLUB HEAD

(75) Inventor: Jung-Yao Tsai, Kaohsiung Hsien (TW)

(73) Assignee: Nelson Precision Casting Co., Ltd., Kaohsiung (TW)

(*) Notice: Subject to any disclaimer, the term of this patent is extended or adjusted under 35 U.S.C. 154(b) by 0 days.

(21) Appl. No.: 10/637,618

(22) Filed: Aug. 11, 2003

(65) Prior Publication Data
US 2005/0034835 A1 Feb. 17, 2005

(51) Int. Cl.$^7$ .......................... B22D 23/00; B23P 17/00
(52) U.S. Cl. ..................................... 164/76.1; 29/527.6
(58) Field of Search .................. 164/76.1, 113, 164/119, 120; 29/527.5, 527.6, 527.7; 72/377

(56) References Cited

U.S. PATENT DOCUMENTS

| | | | | |
|---|---|---|---|---|
| 2,931,098 A | * | 4/1960 | Johnson, Jr. ................ | 29/527.7 |
| 5,167,733 A | * | 12/1992 | Hsieh .......................... | 148/522 |
| 6,719,642 B2 | * | 4/2004 | Wahl et al. ................... | 473/291 |
| 6,776,728 B1 | * | 8/2004 | Chen et al. .................. | 473/349 |
| 2004/0147343 A1 | * | 7/2004 | Billings et al. .............. | 473/349 |

* cited by examiner

Primary Examiner—Kevin P. Kerns
(74) Attorney, Agent, or Firm—Birch Stewart Kolasch & Birch LLP

(57) ABSTRACT

A method for manufacturing a golf club head includes preparing a golf club head casting by casting, the golf club head casting having a striking face, forging the golf club head casting at least one time and removing cinders in the golf club head casting, thereby forming a golf club head blank, and removing burrs on the golf club head blank. The golf club head casting may be heated before the step of forging.

12 Claims, 5 Drawing Sheets

METHOD FOR MANUFACTURING A GOLF CLUB HEAD

BACKGROUND OF THE INVENTION

1. Field of the Invention

The present invention relates to a method for manufacturing a golf club head.

2. Description of Related Art

FIG. 7 of the drawings illustrates a conventional forging process for manufacturing a golf club head. An ingot 70 made of carbon steel or alloy steel is subjected to several forging procedures while passing through several forging molds 71a–71d. The cavities 72a–72d respectively of the forging molds 71a–71d vary in shape in sequence to thereby gradually forge the ingot 70 to a shape corresponding to the respective cavity 72a–72d, thereby forming blanks 70a–70d of a golf club head. Finally, the golf club head blank 70d is subjected to several surface finishing procedures to obtain a final product of a golf club head.

In spite of the advantages of uniform steel distribution and high strength of the golf club head made by forging, the forging molds 71a–71d are complicated in elements of a molding assembly and thus increase the cost and not suitable for mass production. Further, frequent replacement of the forging molds 71a–71d is required, as they are apt to deform under the forging pressure. Further, significant deformation of the forging molds 71a–71d occurs while forging the ingot 70 to the golf club head blank 70d during the forging process, which results in deformation of the peripheries delimiting the cavities 72a–72d. As a result, the golf club head products of a standard size could not be obtained.

FIGS. 8A through 8E illustrate another conventional process for manufacturing a golf club head by casting. A casting mold 81 having a cavity 811 is prepared, wherein the cavity 811 is configured corresponding to the specification of a predetermined golf club head. Molten wax is poured into the cavity 811 of the casting mold 81 for forming a wax mold 80 (FIG. 8A). The wax mold 80 is then removed from the cavity 811 and immersed in a solution to form a ceramic outer mold 82 (FIG. 8B). Next, the wax mold 80 is melted and flows out of the ceramic outer mold 82 (FIG. 8C). Then, molten metal liquid is filled into the ceramic outer mold 82 (FIG. 8D) to form a golf club head blank 83 (FIG. 8E). The golf club head blank 83 is then subjected to several surface finishing procedures to obtain a final product of a golf club head.

The golf club head manufactured by casting is suitable for mass production and has a low manufacturing cost. Further, the golf club head manufactured by casting has improved properties in the stretching-resistance, wear-resistance, and metal fatigue, which are almost equivalent to those of a golf club head manufactured by forging. However, undesired cinder holes 84 (or sand holes, air holes) are apt to be formed in the surface of the golf club head blank 83 during the casting process, as shown in FIG. 9. The cinder holes 84 remain in the surface of the final product of the golf club head or the dimension of the final product of the golf club head is adversely affected if the surface polishing of the golf club head blank 83 is insufficient or excessive. Further, formation of the golf club head blank 83 would not be appropriate if the ceramic outer mold 82 is not completely filled with the molten metal as a result of poor flowability of the molten metal.

Cinder holes 84 cause more serious problems to a golf club head made of a Fe—Mn—Al alloy having a high viscosity and thus having a poor casting property, resulting in disqualified products. Further, in a case that an alloy of 8620 or 4130 is used for manufacturing a golf club head, the golf club head provides a good shock-absorbing effect and a good feeling while striking the golf ball, as the alloy of 8620 or 4130 has a low hardness about HRB 80–100. However, in the above-mentioned casting process, the molten alloy could not be reliably filled in the ceramic outer mold 82 and thus fail to obtain a golf club head blank 83 with a good shape.

OBJECTS OF THE INVENTION

An object of the present invention is to provide a method for manufacturing a golf club head that is low at cost and suitable for mass production and speeds up the process.

Another object of the present invention is to provide a method for manufacturing a golf club head that forges a casting one time by a single forging mold to remove cinder holes of the casting that has a preserved volume for processing.

A further object of the present invention is to provide a method for manufacturing a golf club head that allows use of a casting in which cinder holes are apt to be formed without adversely affecting the good product rate of the final products of the golf club heads.

SUMMARY OF THE INVENTION

A method for manufacturing a golf club head in accordance with the present invention includes preparing a golf club head casting by casting, the golf club head casting having a striking face, forging the golf club head casting at least one time and removing cinders in the golf club head casting, thereby forming a golf club head blank, and removing burrs on the golf club head blank.

Other objects, advantages and novel features of this invention will become more apparent from the following detailed description when taken in conjunction with the accompanying drawings.

DETAILED DESCRIPTION OF THE PREFERRED EMBODIMENT

A preferred embodiment of the present invention is now to be described hereinafter in detail.

Figure 1:
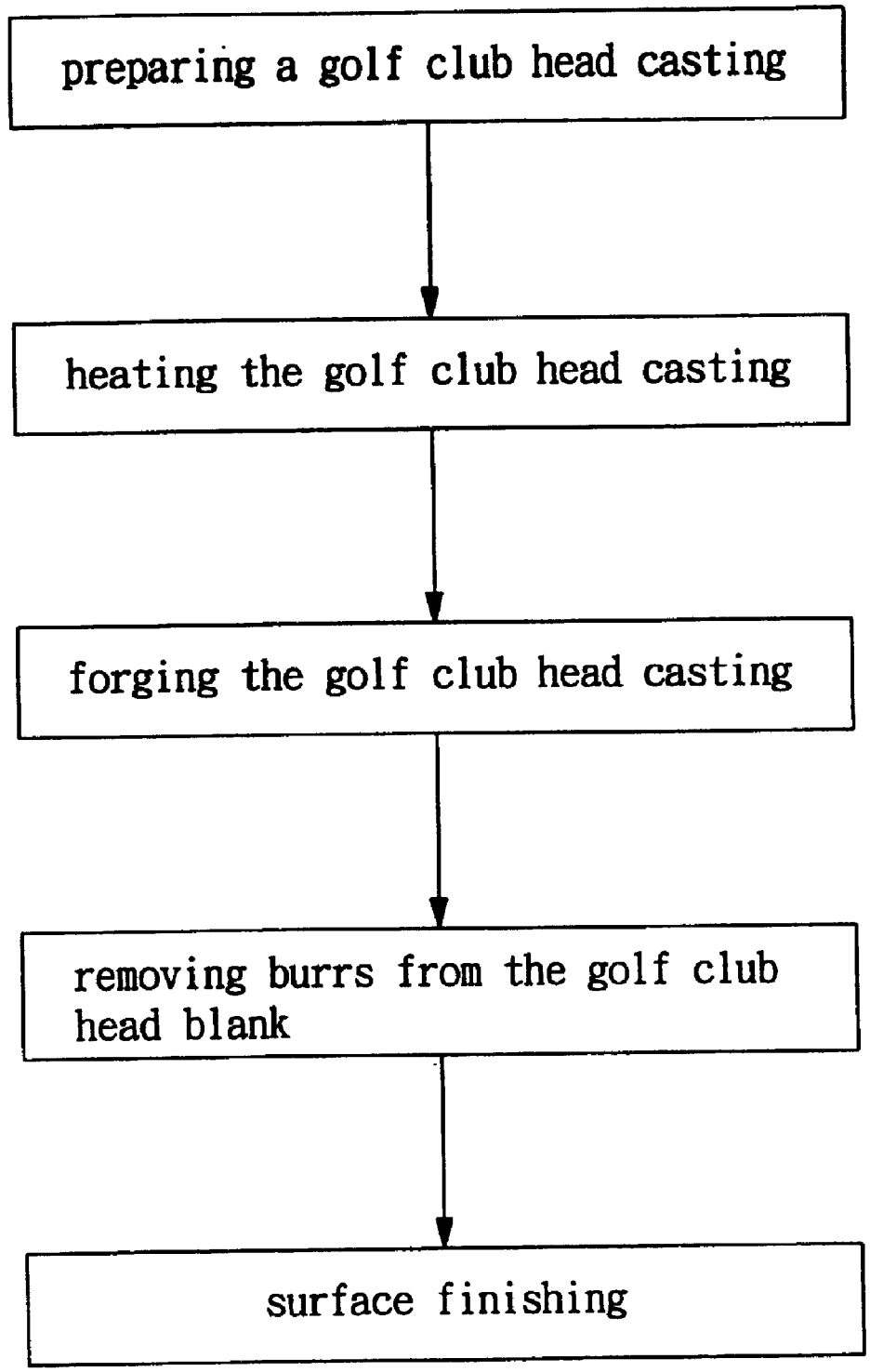
FIG. 1 is a flowchart illustrating a method for manufacturing a golf club head in accordance with the present invention.
Figure 2:
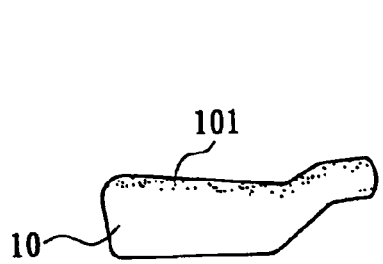
FIG. 2 is a side view of a golf club head casting used in the method in accordance with the present invention.
Figures 8A, 8B, 8C, 8D, 8E:
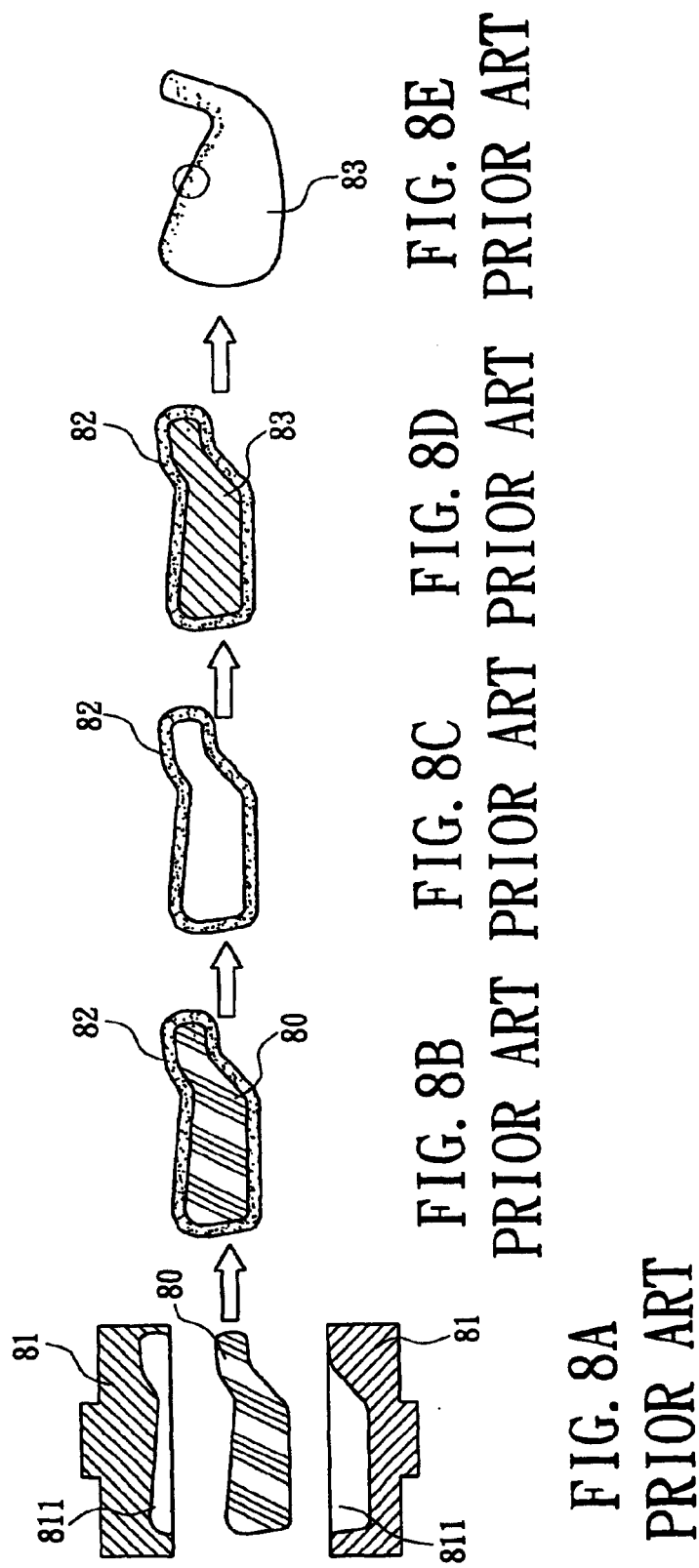
FIGS. 8A through 8E are schematic diagrams illustrating another conventional casting process for manufacturing a golf club head.
Figure 9:
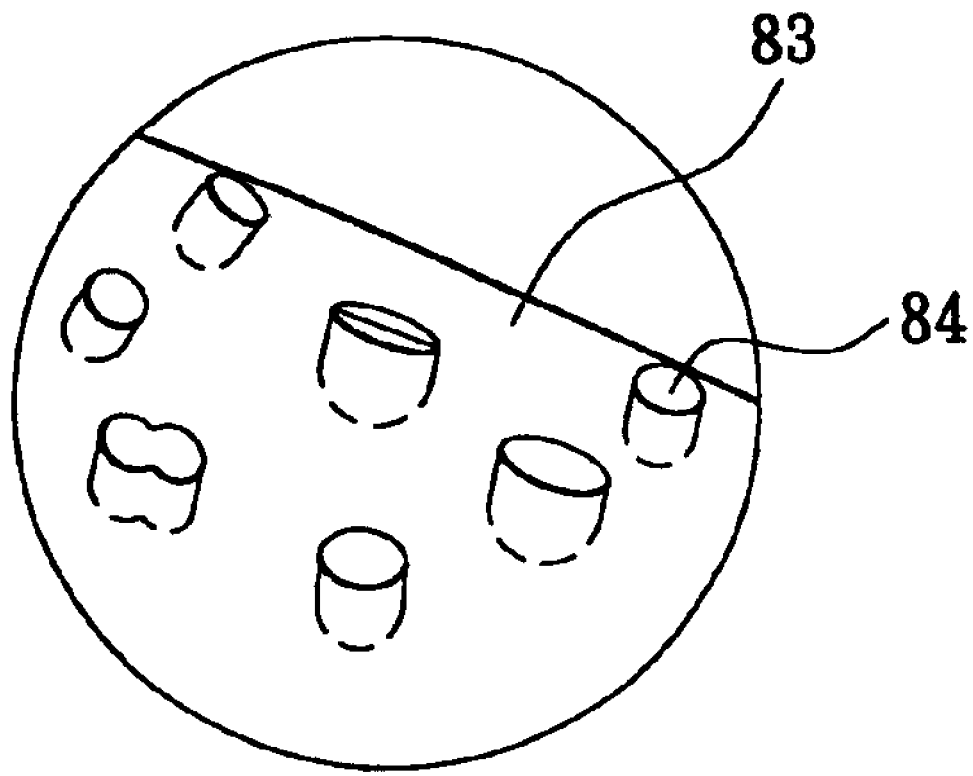
FIG. 9 is an enlarged view illustrating cinder holes in a golf club head manufactured by the conventional process of FIGS. 8A through 8E.

Referring to FIGS. 1 and 2, a first step of a method for manufacturing a golf club head in accordance with the present invention includes preparing a golf club head casting 10 that is made by casting to a volume having a processing tolerance (i.e., a preserved volume for processing) allowing subsequent processing to form a final product of a golf club head 10a. The golf club head casting 10 is obtained by, e.g., the casting process of FIG. 8 or other processes. The golf club head casting 10 has a striking face, and the casting material for the golf club head casting 10 is selected from metals or alloys such as a Fe—Mn—Al alloy or an alloy steel of 8620 or 4130. In this embodiment, the overall volume of the golf club head casting 10 is equal to a sum of reduced volume in a forging step, a volume of burrs to be removed, removed volume in surface finishing, and a volume of the final product of the golf club head 10a. Namely, the preserved volume for processing of the golf club head casting 10 is equal to a sum of reduced volume in a forging step, a volume of burrs to be removed, and removed volume in surface finishing.

Still referring to FIGS. 1 and 2, a second step of the method in accordance with the present invention is heating the golf club head casting 10 to increase the malleability, which allows easy forging formation and reduces loss and deformation of a forging mold 20 in the following step. Preferably, the golf club head casting 10 is heated to 750–1050° C. before forging.

Figure 3:
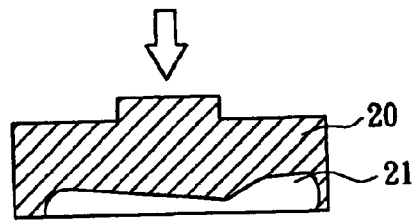
FIG. 3 is an exploded sectional view illustrating a forging step of the method in accordance with the present invention.
Figure 3:
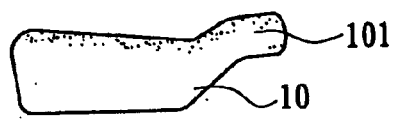
Figure 3:
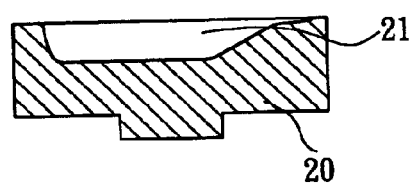
Figure 4:
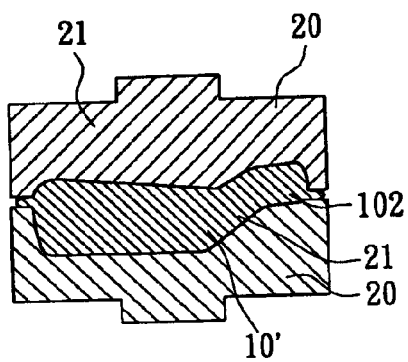
FIG. 4 is a sectional view illustrating generation of burrs on the golf club head blank after the forging step.

Referring to FIGS. 1, 3, and 4, a third step of the method in accordance with the present invention is forging the golf club head casting 10 by the forging mold 20 to remove cinder holes 101 in the golf club head casting 10 and to form a golf club head blank 10'. Namely, after heating to the predetermined temperature to increase the malleability, the golf club head casting 10 is forged by the forging mold 20. The golf club head casting 10 can be forged one time by a single forging mold. Nevertheless, the golf club head casting 10 can be forged as many times as desired. The forging force is preferably maintained at 500–1000 tons. The forging mold 20 has a cavity 21 corresponds to the size of the final product of the golf club head 10a. When the golf club head casting 10 is placed in the cavity 21 and forged, the forging travel of the forging mold 20 during the forging step is preferably not greater than 1 mm. Further, the reduced volume in the actual forging step is preferably controlled to be equal to the predetermined reduced volume in the forging step. Thus, the golf club head casting 10 can be forged to a golf club head blank 10' that has a specification approximate to that of the final product of the golf club head 10a. At the same time, the cinder holes 101 in the surface of the golf club head casting 10 are removed in the forging step, avoiding the risk of disqualified products resulting from the cinder holes 101.

Further, after forging, a surface layer of 0.3–0.5 mm of the golf club head blank 10' possesses a stream-lined microstructure, thereby improving the mechanical properties of the surface of the golf club head blank 10'. At the same time, the structure of the portion under the surface layer of the golf club head blank 10' possesses excellent toughness of casting. Further, since the cinder holes 101 in the surface of the golf club head casting 10 can be effectively removed by the combined casting/forging process, a casting obtained from a Fe—Mn—Al alloy that tends to have cinder holes as a result of poor casting property can be used without adversely affecting the good product rate of the final products of the golf club heads 10a.

Figure 5:
FIG. 5 is a side view of the golf club head blank after removal of the burrs.

Referring to FIGS. 1, 4, and 5, a fourth step of the method in accordance with the present invention is removing burrs 102 generated in the forging step from the golf club head blank 10' after removing the golf club head blank 10' out of the forging mold 20. During the high-pressure forging step, burrs 102 are usually formed on the golf club head blank 10' in a position adjacent to an outer portion of the cavity 21 of the forging mold 20. After the golf club head blank 10' is removed from the forging mold 20 and cooled and takes shape, the volume of the burrs 102 to be removed is preferably controlled to be equal to the predetermined volume of the burrs 102 to be removed. Thus, the golf club head blank 10' after removal of the burrs 102 has a volume approximately equal to the volume of the final product of the golf club head 10a and the volume to be removed in the subsequent surface finishing.

Figure 6:
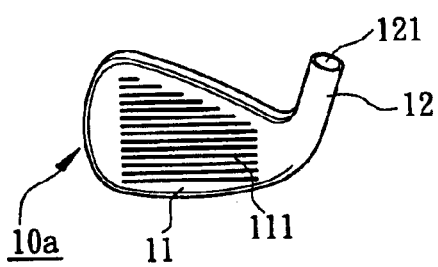
FIG. 6 is a perspective view of a final product of the golf club head manufactured by the method in accordance with the present invention.
Figure 7:
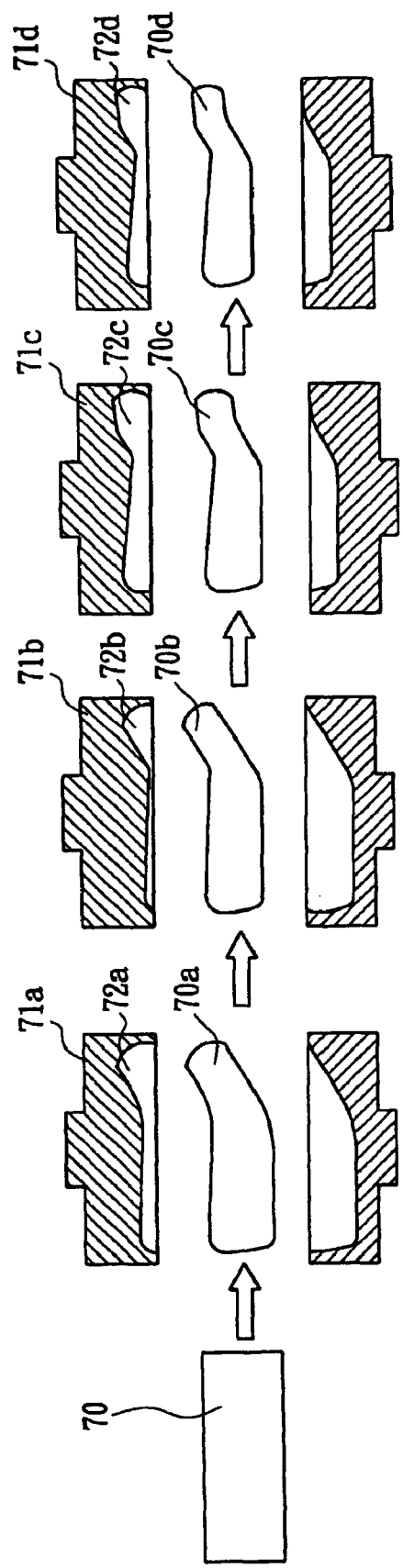
FIG. 7 is a schematic diagram illustrating a conventional forging process for manufacturing a golf club head.

Referring to FIGS. 1 and 6, the golf club head blank 10' is subjected to surface finishing to obtain the final product of the golf club head 10a. The golf club head 10a includes at least a striking face 11 and a neck 12. The surface finishing includes various precision mechanical processing, such as forming grooves 111 on the striking face 11 and an engaging hole 121 in the neck 12, sanding, grinding, polishing, mirror finishing, satin finishing, painting, mechanical or laser engraving, printing of patterns and/or marks, painting protective paints, applying a protective film, and adjusting an angular position of the neck 12. Thus, the final products of the golf club heads 10a have a uniform specification as well as an aesthetically pleasing appearance. A vertical dimension of the striking face of the final product of the golf club head 10a is greater than that of the golf club head casting 10' by not greater than 1 mm.

According to the above description, the method in accordance with the present invention allows rapid manufacture of a golf club head at a low cost and is suitable for mass production. It is achieved by means of preparing a golf club head casting 10 and forging the golf club head casting 10. Further, the surface properties and strength of the final product of the golf club head 10a are improved, the cinder holes 101 are eliminated, and the process is speeded up.

While the principles of this invention have been disclosed in connection with its specific embodiment, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A method for manufacturing a golf club head, comprising:

preparing a club casting with a roughly predetermined shape preserving a forging allowance in casting step, the club casting roughly having a striking face and subsequently;

forging the club casting in one-step forging in a forging mold apparatus and removing cinders from the club casting, thereby forming a golf club head blank; and removing burrs from the golf club head blank.

2. The method for manufacturing a golf club head as claimed in claim 1, further including a step of surface finishing the golf club head blank to form a final product of a golf club head.

3. The method for manufacturing a golf club head as claimed in claim 2, wherein the golf club head has a preserved volume for processing equal to a sum of a reduced volume of the club casting in the forging step, a volume of the burrs removed, and a removed volume in the step of surface finishing.

4. The method for manufacturing a golf club head as claimed in claim 3, wherein the preserved volume for processing of the club casting serves to cause an increase of a vertical dimension of a striking face of the final product of the golf club head.

5. The method for manufacturing a golf club head as claimed in claim 4, wherein the increase of the vertical dimension is less than 1 mm.

6. The method for manufacturing a golf club head as claimed in claim 1, wherein the club casting is obtained by a casting process using a wax mold to form a ceramic outer mold in which the club casting is formed.

7. The method for manufacturing a golf club head as claimed in claim 1, further including a step of heating the club casting to increase malleability before the step of forging.

8. The method for manufacturing a golf club head as claimed in claim 7, wherein the club casting is heated to 750–1050° C.

9. The method for manufacturing a golf club head as claimed in claim 1, wherein the club casting is forged by a forging mold at a forging pressure of 500–1000 tons.

10. The method for manufacturing a golf club head as claimed in claim 1, wherein the club casting is made of a Fe—Mn—Al alloy.

11. The method for manufacturing a golf club head as claimed in claim 1, wherein the club casting is made by casting a 4130 alloy.

12. The method for manufacturing a golf club head as claimed in claim 1, wherein the club casting is made by casting an 8620 alloy.

* * * * *